US008446400B2

(12) United States Patent
Wu et al.

(10) Patent No.: US 8,446,400 B2
(45) Date of Patent: May 21, 2013

(54) DRIVING APPARATUS FOR DRIVING A DISPLAY PANEL AND SOURCE DRIVER THEREOF

(75) Inventors: Meng-Ju Wu, Hsin-Chu (TW); Chun-Fan Chung, Hsin-Chu (TW); Yu-Hsi Ho, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 337 days.

(21) Appl. No.: 12/857,527

(22) Filed: Aug. 16, 2010

(65) Prior Publication Data

US 2011/0227892 A1 Sep. 22, 2011

(30) Foreign Application Priority Data

Mar. 17, 2010 (TW) ................................ 99107784 A

(51) Int. Cl.
*G06F 3/038* (2006.01)
*G09G 5/10* (2006.01)

(52) U.S. Cl.
USPC ............................................ 345/211; 345/690

(58) Field of Classification Search
USPC .................. 345/98, 100, 168, 173, 178, 208, 345/92, 211–214, 204, 205, 690, 698
See application file for complete search history.

(56) References Cited

U.S. PATENT DOCUMENTS

2003/0085868 A1 5/2003 Paul
2006/0125757 A1 * 6/2006 Kang et al. ...................... 345/98
2008/0001898 A1 * 1/2008 Chang ........................... 345/100

* cited by examiner

*Primary Examiner* — Michael Faragalla
(74) *Attorney, Agent, or Firm* — Winston Hsu; Scott Margo

(57) ABSTRACT

A driving apparatus for driving a display panel includes a timing controller and a plurality of source drivers. The timing controller has a first output port and a second output port. The first output port is employed to output a first clock signal and plural first data signals. The second output port is employed to output a second clock signal and plural second data signals. Each source driver includes at least two operation mode control ends for receiving an operation mode control signal having at least two bits for setting at least first to third operation modes. If the operation mode control signal sets the source driver to operate in the first operation mode, the source driver is electrically connected to both the first and second output ports, for driving the display panel according to the first data signals, the second data signals, the first clock and the second clock.

18 Claims, 12 Drawing Sheets

DRIVING APPARATUS FOR DRIVING A DISPLAY PANEL AND SOURCE DRIVER THEREOF

BACKGROUND OF THE INVENTION

1. Field of the Invention

The present invention relates to a driving apparatus and source driver thereof, and more particularly, to a driving apparatus and source driver thereof for driving a display panel.

2. Description of the Prior Art

Along with the advantages of thin appearance, low power consumption, and low radiation, liquid crystal displays (LCDs) have been widely applied in various electronic products for panel displaying. The operation of a liquid crystal display is featured by varying voltage drops between opposite sides of a liquid crystal layer for twisting the angles of the liquid crystal molecules in the liquid crystal layer so that the transparency of the liquid crystal layer can be controlled for illustrating images with the aid of the light source provided by a backlight module. In general, the liquid crystal display comprises a driving apparatus and a liquid crystal display panel. The driving apparatus is employed to provide a plurality of data driving signals to the liquid crystal display panel based on plural data signals, a horizontal synchronization signal, a vertical synchronization signal, a data enable signal and a clock signal.

FIG. 1 is a schematic diagram showing the structure of a prior-art liquid crystal display. As shown in FIG. 1, the liquid crystal display 100 comprises a driving apparatus 110 and a display panel 190. The driving apparatus 110 includes a timing controller 120 and a plurality of source drivers 150. The timing controller 120 has a first output port 121 and a second output port 122, i.e. based on two-port architecture. The first output port 121 is employed to output a first clock signal Sck1 and plural first data signals Sdata1. The second output port 122 is employed to output a second clock signal Sck2 and plural second data signals Sdata2. The first data signals Sdata1, the first clock signal Sck1, the second data signals Sdata2 and the second clock signal Sck2 are differential signals. Each source driver 150 includes an input port 155 and a driving output port 158. The input port 155 is electrically connected to the first output port 121 or the second output port 122. The driving output port 158 is electrically connected to the display panel 190. Regarding the structure of the driving apparatus 110, the input ports 155 of the source drivers X1~X3 are electrically connected to the second output port 122 for receiving the second data signals Sdata2 and the second clock signal Sck2, and the input ports 155 of the source drivers X4~X6 are electrically connected to the first output port 121 for receiving the first data signals Sdata1 and the first clock signal Sck1. It is noted that the number of the source drivers 150 disposed in the driving apparatus 110 are even.

In the structure of another prior-art liquid crystal display, the timing controller therein is based on single-port architecture and has only one output port for providing plural first data signals, plural second data signals and single clock signal. And each source driver receives all of the first data signals, the second data signals and the single clock signal. With the above in mind, it is obvious that the number of connection lines required for delivering data signals in two-port architecture is roughly half that of connection lines required for delivering data signals in single-port architecture. Consequently, the number of via holes required for each source driver in two-port architecture is significantly less than that of via holes required for each source driver in single-port architecture. In general, if the number of via holes is reduced, the signal integrity (SI) of differential signals is better and, in turn, the noise tolerance is higher, i.e. more suitable for achieving a high-frequency operation.

Besides, if the number of connection lines is reduced, the printed circuit board (PCB) which mounts the driving apparatus is able to spare more board area for accommodating more terminal resistors so as to further improve the signal integrity of differential signals received by each source driver. That is, although single-port architecture is suitable for disposing odd or even number of source drivers, most of the driving apparatus are still designed based on two-port architecture with the aim of enhancing operational performance. Furthermore, along with the development of the liquid crystal display having high resolution, the number of data driving lines connected to the display panel installed therein is increasing more and more, and the number of data driving lines connected to each source driver installed therein is also greater than ever. Following such development, the driving apparatus of the liquid crystal display is preferably required to accommodate odd number of source drivers. However, the prior-art driving apparatus based on two-port architecture is not suitable for accommodating odd number of source drivers, which means that the design of driving apparatus is hard to achieve both excellent operational performance and high application flexibility.

SUMMARY OF THE INVENTION

In accordance with one embodiment of the present invention, a driving apparatus is provided for driving a display panel. The driving apparatus comprises a timing controller and a plurality of source drivers. The timing controller comprises a first output port and a second output port. The first output port of the driving apparatus is utilized for outputting plural first data signals and a first clock signal. The second output port of the driving apparatus is utilized for outputting plural second data signals and a second clock signal. The source drivers are employed to drive the display panel according to the first data signals and/or the second data signals. Each source driver comprises a first input port, a second input port and at least two operation mode control ends. The first input port of the source driver is electrically connected to the first or second output port of the timing controller. The at least two operation mode control ends is employed to receive an operation mode control signal having at least two bits. The operation mode control signal is put in use for setting the source driver to operate in a first operation mode, a second operation mode or a third operation mode. When the operation mode control signal sets the source driver to operate in the first operation mode, the first input port of the source driver is electrically connected to the first output port of the timing controller for receiving the first data signals and the first clock signal, the second input port of the source driver is electrically connected to the second output port of the timing controller for receiving the second data signals and the second clock signal, and the source driver drives the display panel according to the first data signals, the second data signals, the first clock signal and the second clock signal.

The present invention further provides a source driver for driving a display panel. The source driver comprises a first input port, a second input port, at least two operation mode control ends, and a driving output port. The first input port is utilized for receiving plural first data signals and a first clock signal. The second input port is utilized for receiving plural second data signals and a second clock signal. The at least two operation mode control ends is utilized for receiving an operation mode control signal having at least two bits. The driving output port, electrically connected to the display panel, is employed to output plural data driving signals for driving the display panel. The operation mode control signal is put in use for setting the source driver to operate in a first operation mode, a second operation mode or a third operation mode. When the operation mode control signal sets the source driver to operate in the first operation mode, the source driver drives the display panel according to the first data signals, the second data signals, the first clock signal and the second clock signal.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
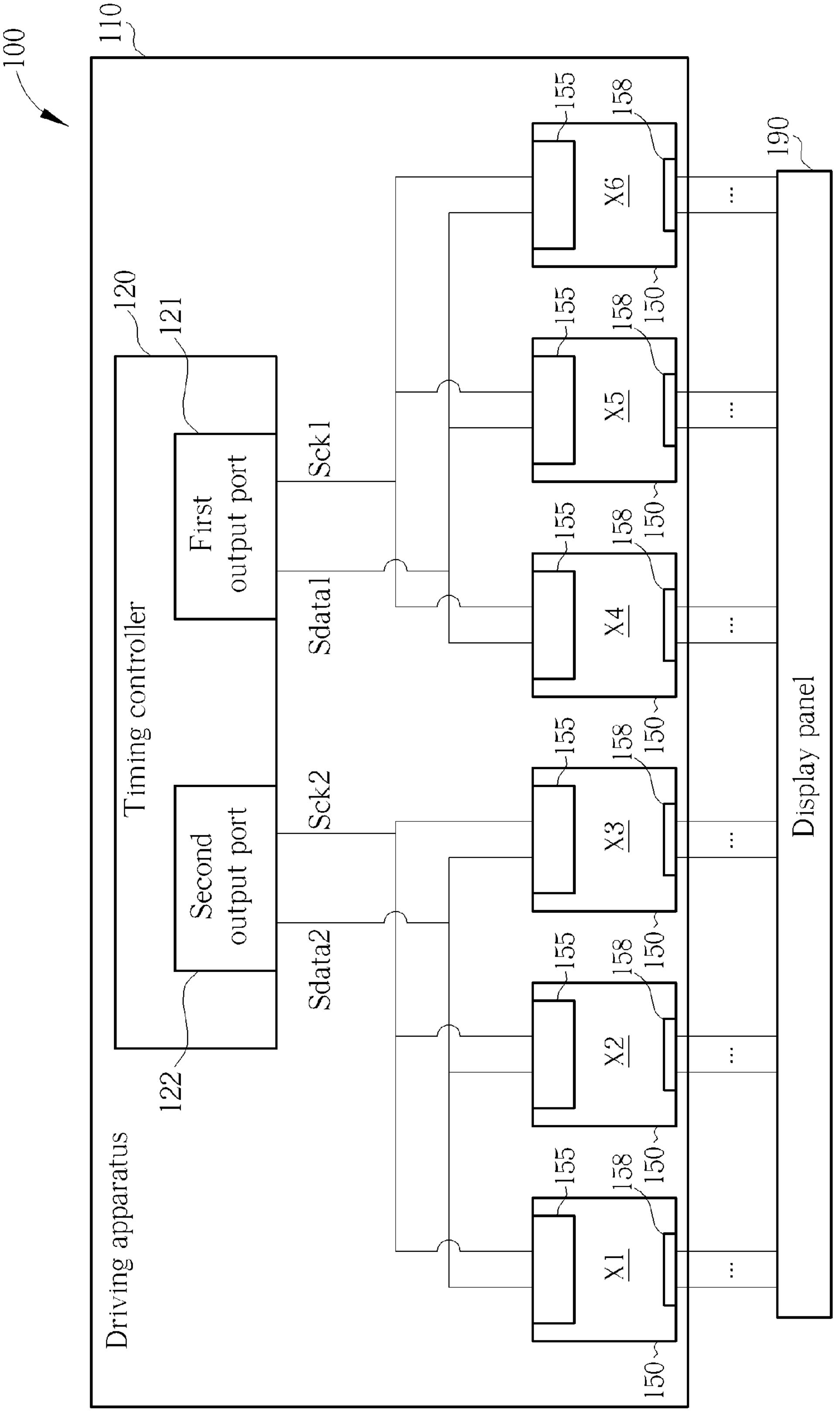
FIG. 1 PRIOR ART
FIG. 1 is a schematic diagram showing the structure of a prior-art liquid crystal display.
Figure 2:
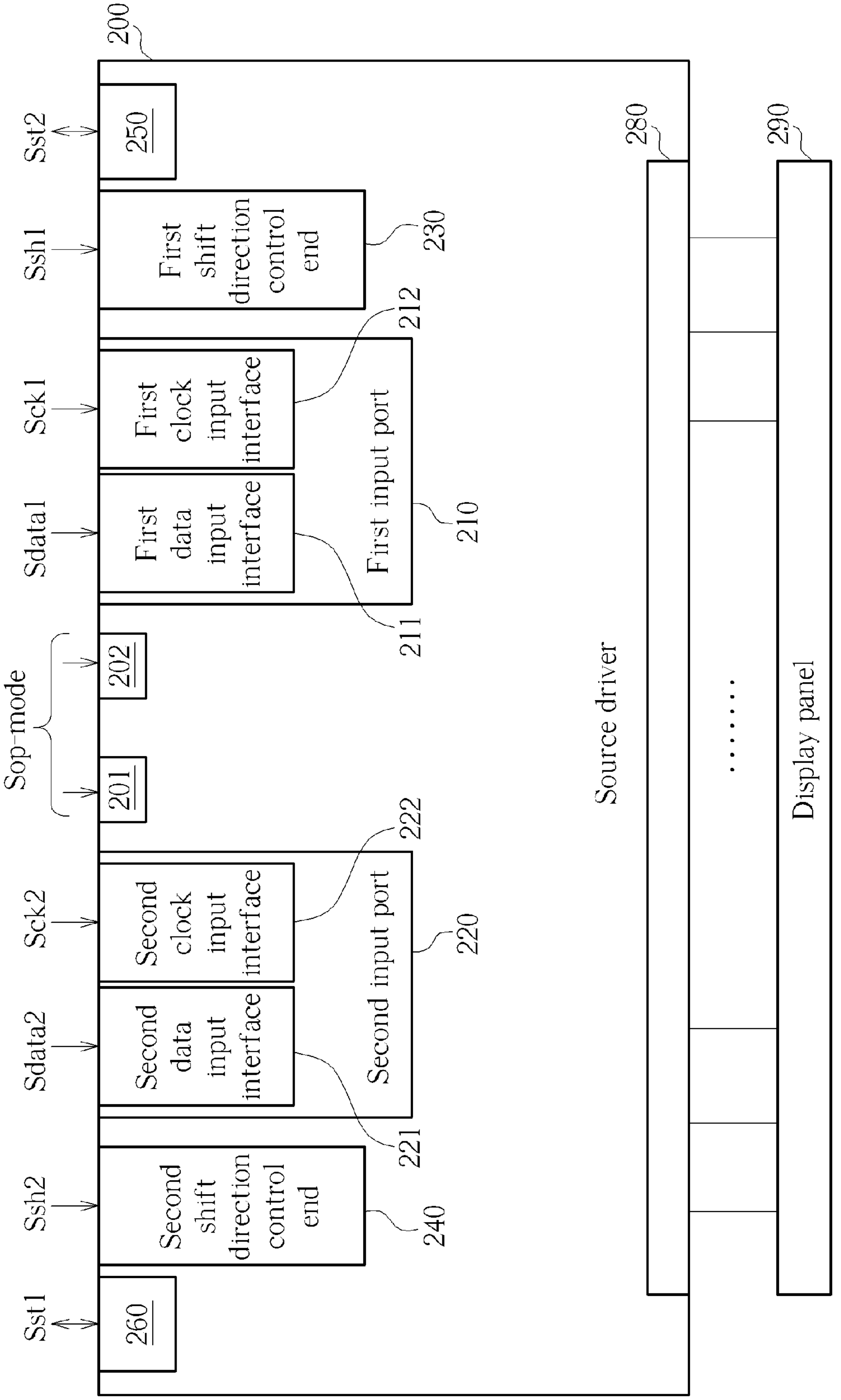
FIG. 2 is a schematic diagram showing the structure of a source driver according to the present invention.

FIG. 2 is a schematic diagram showing the structure of a source driver according to the present invention. As shown in FIG. 2, the source driver 200 comprises a first input port 210, a second input port 220, at least two operation mode control ends 201~202, a first shift direction control end 230, a second shift direction control end 240, a first start signal input/output end 260, a second start signal input/output end 250, and a driving output port 280. The first input port 210 includes a first data input interface 211 and a first clock input interface 212. The first data input interface 211 is employed to receive plural first data signals Sdata1, and the first clock input interface 212 is employed to receive a first clock signal Sck1. The second input port 220 includes a second data input interface 221 and a second clock input interface 222. The second data input interface 221 is employed to receive plural second data signals Sdata2, and the second clock input interface 222 is employed to receive a second clock signal Sck2. The first data signals Sdata1, the second data signals Sdata2, the first clock signal Sck1 and the second clock signal Sck2 are differential signals such as mini low voltage differential signals (Mini LVDSs) or reduced swing differential signals (RSDSs).

The at least two operation mode control ends 201~202 are employed to receive an operation mode control signal Sop_mode having at least two bits. The operation mode of the source driver 200 is set by the operation mode control signal Sop_mode. In the embodiments to be set forth below, the operation mode control signal Sop_mode is utilized for setting the source driver 200 to operate in a first operation mode, a second operation mode or a third operation mode. The driving output port 280, electrically connected to a display panel 290, is used to output plural data driving signals for driving the display panel 290. The first shift direction control end 230 is utilized for receiving a first shift direction control signal Ssh1, and the first shift direction of a first shift operation performed by the source driver 200 is set according to the first shift direction control signal Ssh1, for controlling a data latch operation over the first data signals Sdata1 based on the first clock signal Sck1. The second shift direction control end 240 is utilized for receiving a second shift direction control signal Ssh2, and the second shift direction of a second shift operation performed by the source driver 200 is set according to the second shift direction control signal Ssh2, for controlling a data latch operation over the second data signals Sdata2 based on the second clock signal Sck2. When the second shift direction control end 240 is idled, if the second data input interface 221 inputs the second data signals Sdata2, the source driver 200 determines the first shift direction of the first shift operation and the second shift direction of the second shift operation according to the first shift direction control signal Ssh1, for controlling a data latch operation over the first data signals Sdata1 and the second data signals Sdata2 based on the first clock signal Sck1.

It is noted that when the operation mode control signal Sop_mode sets the source driver 200 to operate in the first operation mode, the first shift direction control signal Ssh1 is employed to control the first shift direction of the first shift operation for controlling a data latch operation over the first data signals Sdata1 based on the first clock signal Sck1, and the second shift direction control signal Ssh2 is employed to control the second shift direction of the second shift operation for controlling a data latch operation over the second data signals Sdata2 based on the second clock signal Sck2. When the operation mode control signal Sop_mode sets the source driver 200 to operate in the second operation mode, the first shift direction control signal Ssh1 is employed to control the first shift direction of the first shift operation and the second shift direction of the second shift operation for controlling a data latch operation over the first data signals Sdata1 and the second data signals Sdata2 based on the first clock signal Sck1, and the second clock input interface 222 and the second shift direction control end 240 are idled. When the operation mode control signal Sop_mode sets the source driver 200 to operate in the third operation mode, the first shift direction control signal Ssh1 is employed to control the first shift direction of the first shift operation for controlling a data latch operation over the first data signals Sdata1 based on the first clock signal Sck1, and the second data input interface 221, the second clock input interface 222 and the second shift direction control end 240 are idled.

The second start signal input/output end 250 is employed to input or output the second start signal Sst2. If the second start signal input/output end 250 is utilized for inputting the second start signal Sst2, the source driver 200 starts the first shift operation according to the second start signal Sst2. The first start signal input/output end 260 is employed to input or output the first start signal Sst1. If the first start signal input/output end 260 is utilized for inputting the first start signal Sst1, the source driver 200 starts the second shift operation or the first shift operation according to the first start signal Sst1. If the second start signal input/output end 250 is utilized for outputting the second start signal Sst2 and the first start signal input/output end 260 is utilized for outputting the first start signal Sst1, the source driver 200 starts the first shift operation according to the first shift direction control signal Ssh1 and starts the second shift operation according to the second shift direction control signal Ssh2. That is, if the second start signal input/output end 250 and the first start signal input/output end 260 are utilized for outputting the second start signal Sst2 and the first start signal Sst1 respectively, the first shift direction control signal Ssh1 is further employed to start the first shift operation and the second shift direction control signal Ssh2 is further employed to start the second shift operation.

If the first start signal input/output end 260 is utilized for inputting the first start signal Sst1 and the second start signal input/output end 250 is utilized for outputting the second start signal Sst2, the first start signal Sst1 is employed to start the second shift operation, and the first shift operation is started by one internal start signal generated in the second shift operation or by the first shift direction control signal Ssh1. Alternatively, the first shift operation can be started directly by the first start signal Sst1. If the second start signal input/output end 250 is utilized for inputting the second start signal Sst2 and the first start signal input/output end 260 is utilized for outputting the first start signal Sst1, the second start signal Sst2 is employed to start the first shift operation, and the second shift operation is started by another internal start signal generated in the first shift operation or by the second shift direction control signal Ssh2.

Figure 3:
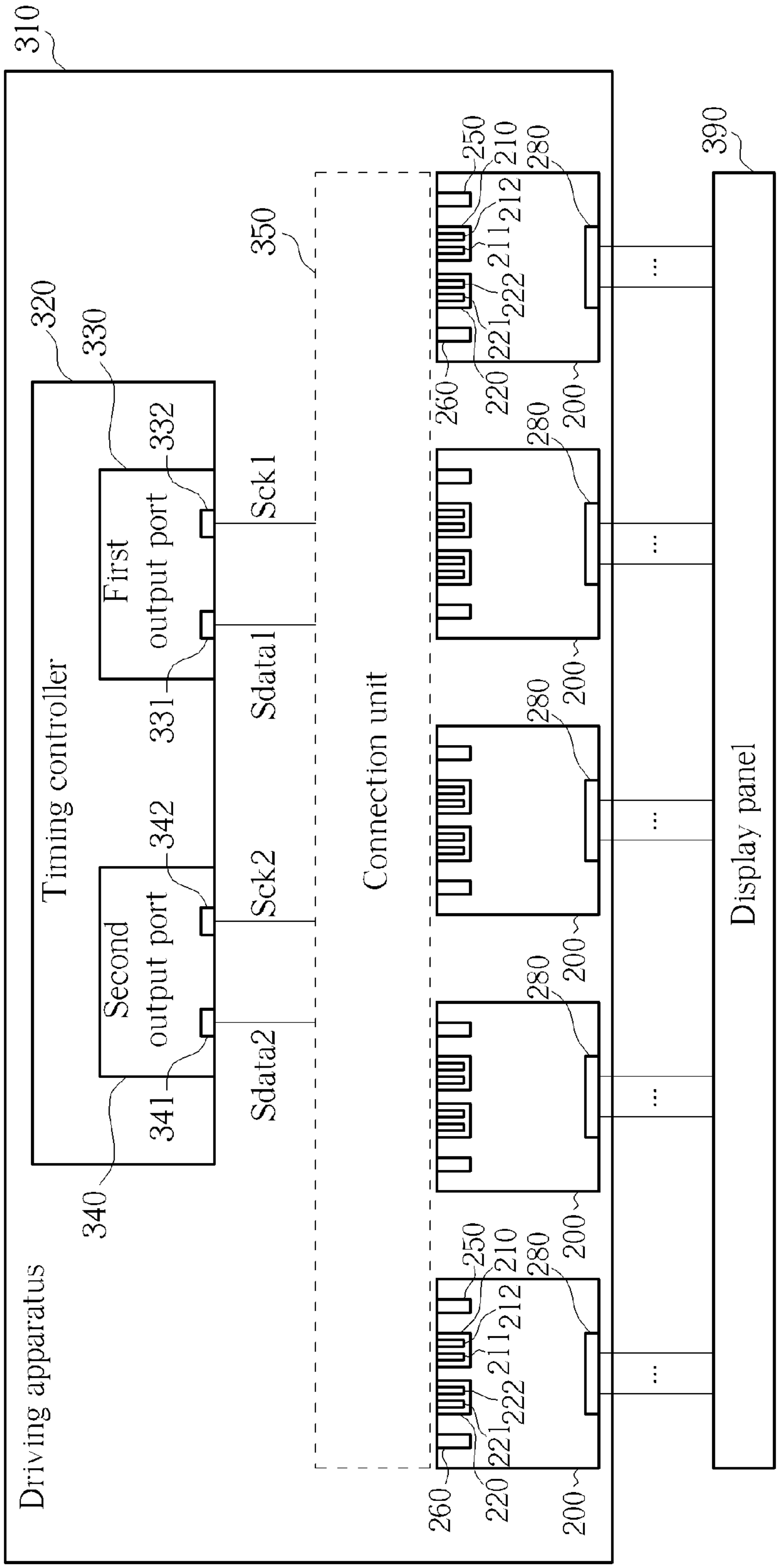
FIG. 3 is a schematic diagram showing the structure of a driving apparatus in accordance with a first embodiment of the present invention.

FIG. 3 is a schematic diagram showing the structure of a driving apparatus in accordance with a first embodiment of the present invention. As shown in FIG. 3, the driving apparatus 310 comprises a timing controller 320 and a plurality of source drivers 200. The timing controller 320 includes a first output port 330 and a second output port 340. The first output port 330 has a first data output interface 331 and a first clock output interface 332. The second output port 340 has a second data output interface 341 and a second clock output interface 342. The first data output interface 331 is employed to output plural first data signals Sdata1, and the first clock output interface 332 is employed to output a first clock signal Sck1. The second data output interface 341 is employed to output plural second data signals Sdata2, and the second clock output interface 342 is employed to output a second clock signal Sck2. The driving apparatus 310 further comprises a connection unit 350 which provides a corresponding electrical connection medium between the timing controller 320 and the source drivers 200 based on desirable circuit functional operation. Since the operation control signals of each source driver 200, e.g. the aforementioned first and second shift direction control signals, are generally provided by an auxiliary circuit (not shown), the connection unit 350 may further provide another corresponding electrically connection medium between the auxiliary circuit and the source drivers 200.

The detailed structure of each source driver 200 is shown in FIG. 2. Regarding various embodiments set forth hereinafter for illustrating the driving apparatus of the present invention, only parts of the structure of each source driver 200 is shown for ease of explanation. As shown in FIG. 3, only the first input port 210, the second input port 220, the second start signal input/output end 250, the first start signal input/output end 260, the first data input interface 211, the first clock input interface 212, the second data input interface 221, the second clock input interface 222 and the driving output port 280 are shown in each source driver 200. And the driving output port 280 of each source driver 200 is electrically connected to a display panel 390 being driven.

Figure 4:
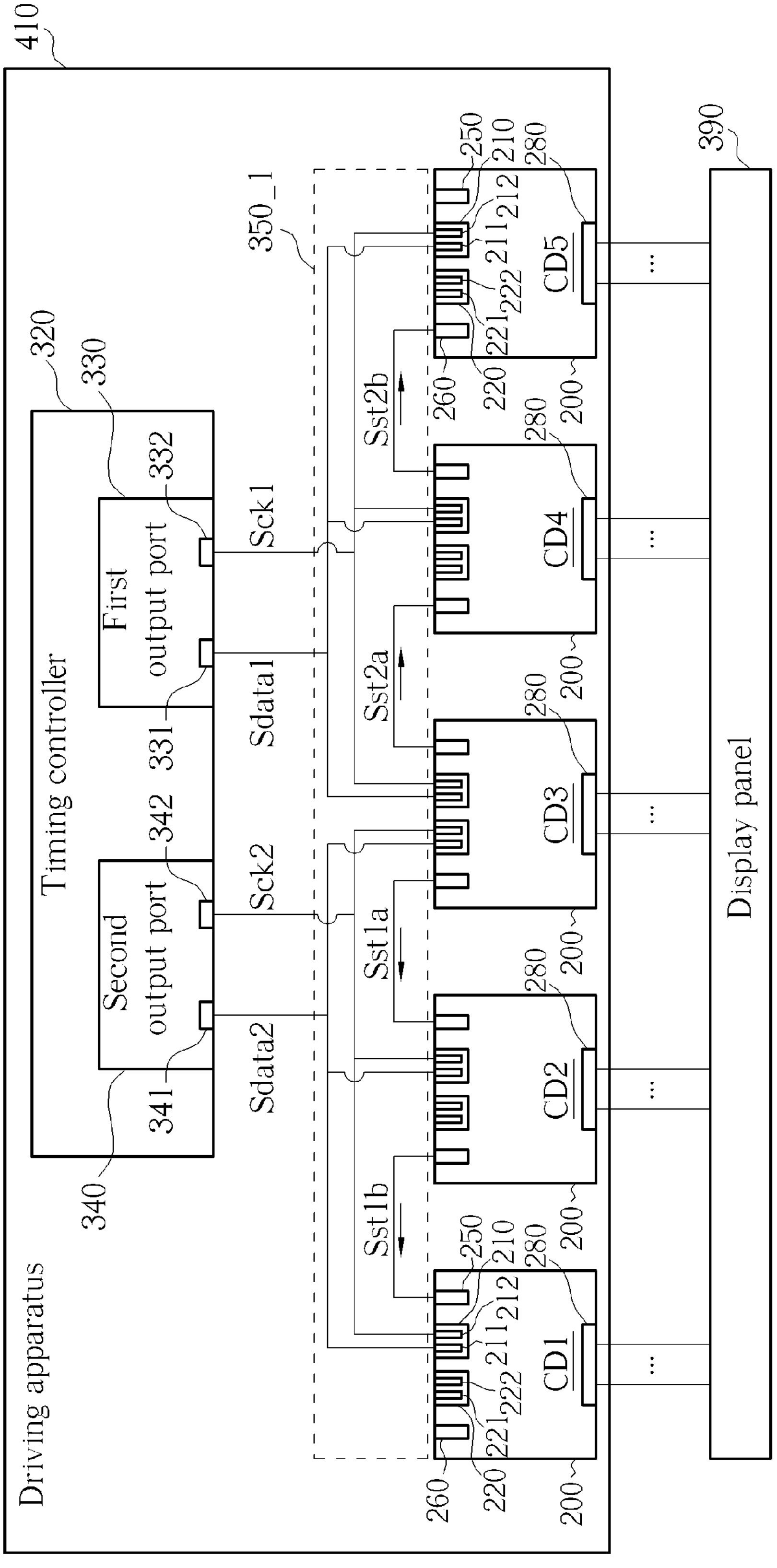
FIG. 4 is a schematic diagram showing the structure of a driving apparatus in accordance with a second embodiment of the present invention.

FIG. 4 is a schematic diagram showing the structure of a driving apparatus in accordance with a second embodiment of the present invention. As shown in FIG. 4, the driving apparatus 410 is similar to the driving apparatus 310 shown in FIG. 3, differing in that the connection unit 350 is replaced with a connection unit 350_1. The connection unit 350_1 provides related electrical connections between the timing controller 320 and the source drivers 200, which are briefed as the following. The first data output interface 331 of the first output port 330 is electrically connected to the first data input interfaces 211 of the source drivers CD3~CD5. The first clock output interface 332 of the first output port 330 is electrically connected to the first clock input interfaces 212 of the source drivers CD3~CD5. The second data output interface 341 of the second output port 340 is electrically connected to the first data input interfaces 211 of the source drivers CD1~CD2 and the second data input interface 221 of the source driver CD3. The second clock output interface 342 of the second output port 340 is electrically connected to the first clock input interfaces 212 of the source drivers CD1~CD2 and the second clock input interface 222 of the source driver CD3. In one embodiment, the first data signals Sdata1 outputted from the first data output interface 331 are corresponding to first-half image data. And the second data signals Sdata2 outputted from the second data output interface 341 are corresponding to second-half image data. It is noted that the second input ports 220 of the source drivers CD1, CD2, CD4 and CD5 are idled.

In the circuit functional operation of the driving apparatus 410, the source driver CD3 is operating in the first operation mode, which is set by the operation mode control signal received by the source driver CD3. The first and second shift operations of the source driver CD3 are right-shift-based operation and left-shift-based operation respectively, which are set by the first and second shift direction control signals received by the source driver CD3. The source drivers CD1, CD2, CD4 and CD5 are set to operate in the third operation mode. Both the first shift operations of the source drivers CD4~CD5 are set to be right-shift-based operation. Both the first shift operations of the source drivers CD1~CD2 are set to be left-shift-based operation. Besides, the second start signal input/output end 250 and the first start signal input/output end 260 of the source driver CD3 are employed to output the second start signal Sst2*a* and the first start signal Sst1*a* respectively, and therefore the first and second shift direction control signals received by the source driver CD3 are further employed to start the first and second shift operations of the source driver CD3 respectively. In the operation of the source drivers CD4~CD5 based on the third operation mode, the source driver CD4 receives the second start signal Sst2*a* functioning as the first start signal thereof for starting the first shift operation of the source driver CD4 which in turn generates the second start signal Sst2*b* furnished to the source driver CD5 for starting the first shift operation of the source driver CD5. In the operation of the source drivers CD1~CD2 based on the third operation mode, the source driver CD2 receives the first start signal Sst1*a* functioning as the second start signal thereof for starting the first shift operation of the source driver CD2 which in turn generates the first start signal Sst1*b* furnished to the source driver CD1 for starting the first shift operation of the source driver CD1. To sum up, in the operation of the driving apparatus 410, the source drivers CD3~CD5 performs a right-shift-based data latch operation on the first data signals Sdata1 according to the first clock signal Sck1, and the source drivers CD1~CD3 performs a left-shift-based data latch operation on the second data signals Sdata2 according to the second clock signal Sck2, for providing plural data driving signals to drive the display panel 390.

Figure 5:
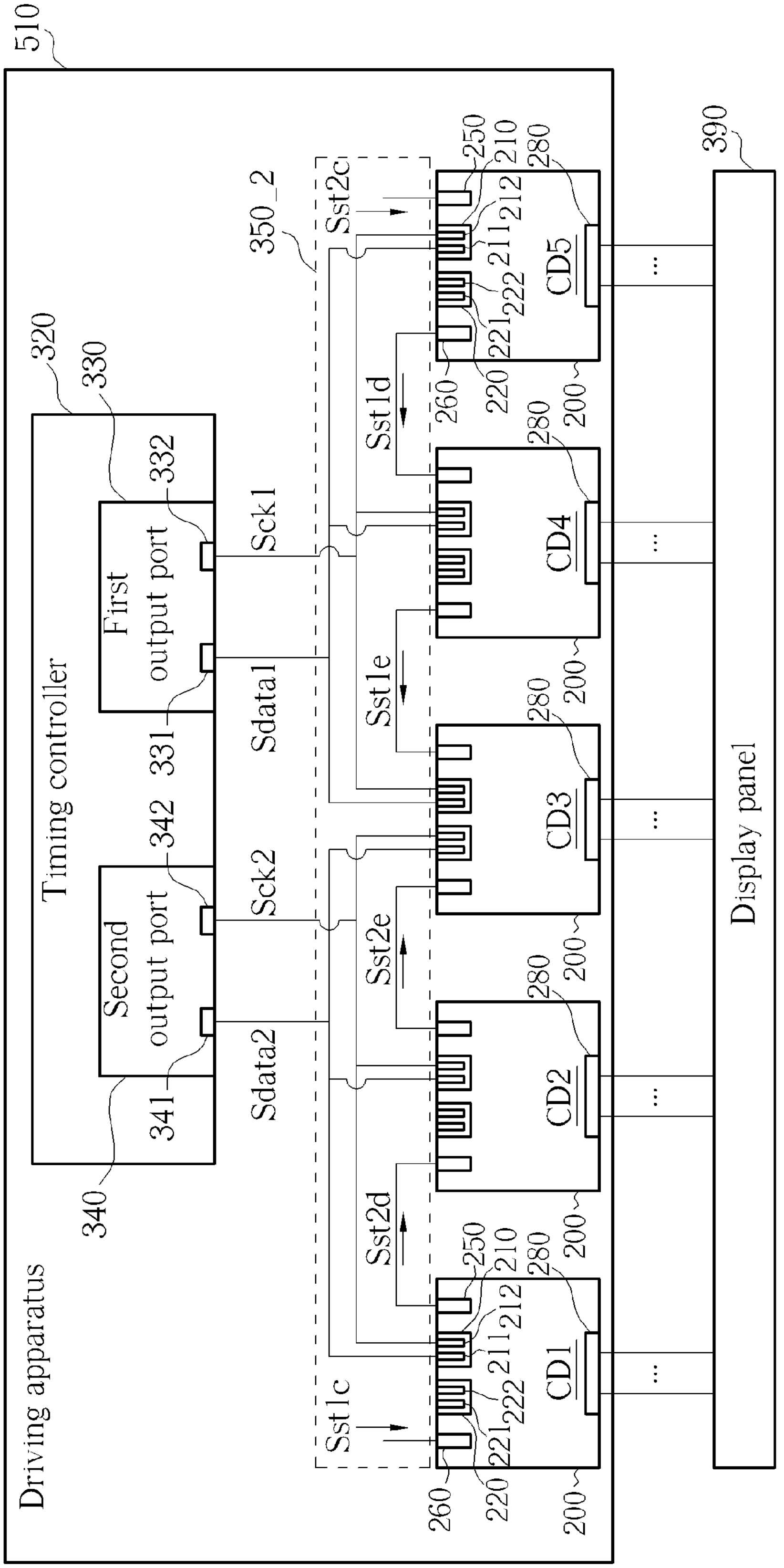
FIG. 5 is a schematic diagram showing the structure of a driving apparatus in accordance with a third embodiment of the present invention.

FIG. 5 is a schematic diagram showing the structure of a driving apparatus in accordance with a third embodiment of the present invention. As shown in FIG. 5, the driving apparatus 510 is similar to the driving apparatus 410 shown in FIG. 4, differing in that the connection unit 350_1 is replaced with a connection unit 350_2. The electrical connection relationship between the timing controller 320 and the source drivers 200 provided by the connection unit 350_2 is identical to that provided by the connection unit 350_1. However, the first start signal input/output end 260 of the source driver CD1 is utilized for inputting the first start signal Sst1*c* which is delivered by one connection line provided by the connection unit 350_2. Besides, the second start signal input/output end 250 of the source driver CD5 is utilized for inputting the second start signal Sst2*c* which is delivered by another connection line provided by the connection unit 350_2. In the circuit functional operation of the driving apparatus 510, the source driver CD3 is also set to operate in the first operation mode, but the first and second shift operations of the source driver CD3 are set to be left-shift-based operation and right-shift-based operation respectively. The source drivers CD1, CD2, CD4 and CD5 are still set to operate in the third operation mode, but both the first shift operations of the source drivers CD4~CD5 are set to be left-shift-based operation and both the first shift operations of the source drivers CD1~CD2 are set to be right-shift-based operation.

In the operation of the source driver CD5 based on the third operation mode, the source driver CD5 receives the second start signal Sst2*c* for starting the first shift operation of the source driver CD5 which in turn generates the first start signal Sst1*d* furnished to the source driver CD4. In the operation of the source driver CD4 based on the third operation mode, the source driver CD4 receives the first start signal Sst1*d* functioning as the second start signal thereof for starting the first shift operation of the source driver CD4 which in turn generates the first start signal Sst1*e* furnished to the source driver CD3. In the operation of the source driver CD1 based on the third operation mode, the source driver CD1 receives the first start signal Sst1*c* for starting the first shift operation of the source driver CD1 which in turn generates the second start signal Sst2*d* furnished to the source driver CD2. In the operation of the source driver CD2 based on the third operation mode, the source driver CD2 receives the second start signal Sst2*d* functioning as the first start signal thereof for starting the first shift operation of the source driver CD2 which in turn generates the second start signal Sst2*e* furnished to the source driver CD3. In the operation of the source driver CD3 based on the first operation mode, the source driver CD3 receives the first start signal Sst1*e* functioning as the second start signal thereof for starting the first shift operation of the source driver CD3. Besides, the source driver CD3 receives the second start signal Sst2*e* functioning as the first start signal thereof for starting the second shift operation of the source driver CD3.

Figure 6:
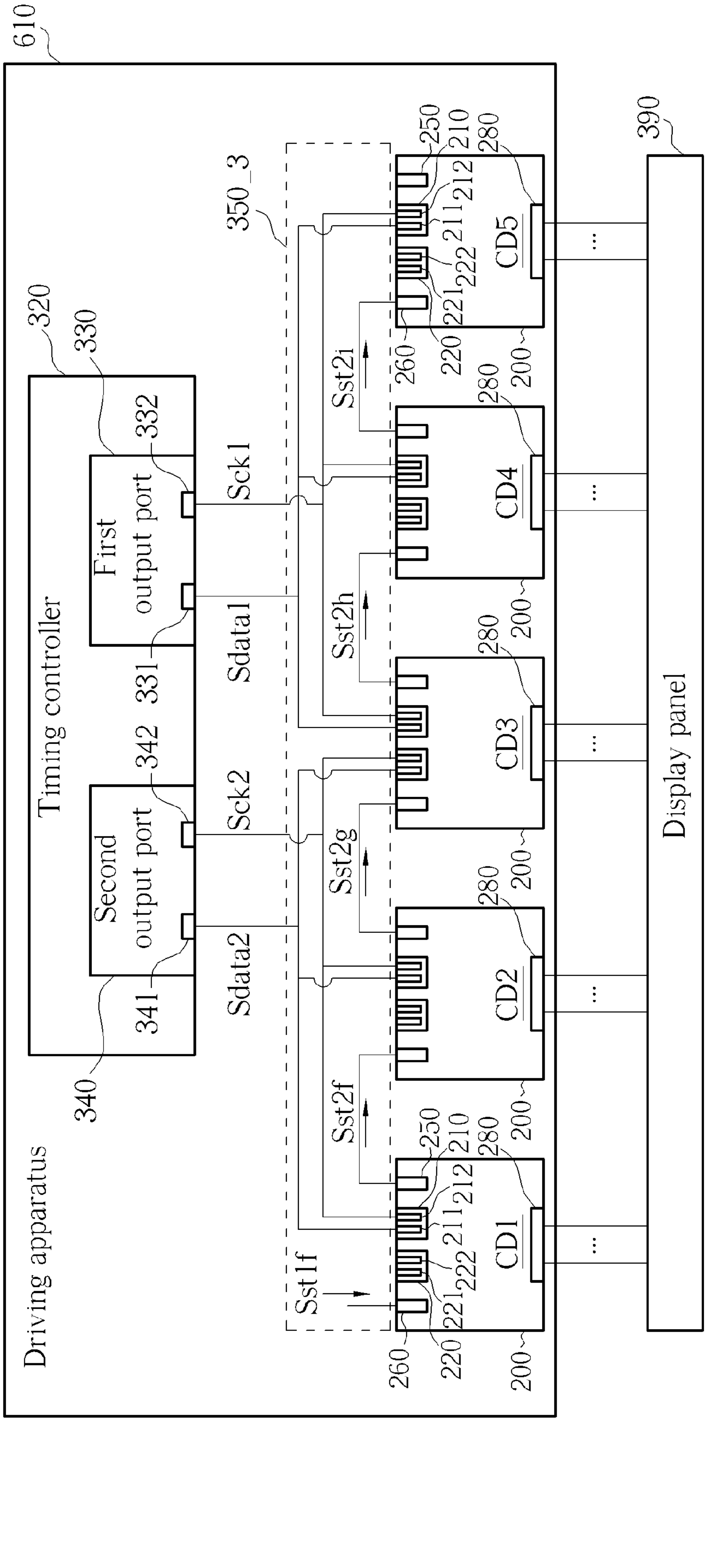
FIG. 6 is a schematic diagram showing the structure of a driving apparatus in accordance with a fourth embodiment of the present invention.

FIG. 6 is a schematic diagram showing the structure of a driving apparatus in accordance with a fourth embodiment of the present invention. As shown in FIG. 6, the driving apparatus 610 is similar to the driving apparatus 410 shown in FIG. 4, differing in that the connection unit 350_1 is replaced with a connection unit 350_3. The electrical connection relationship between the timing controller 320 and the source drivers 200 provided by the connection unit 350_3 is identical to that provided by the connection unit 350_1. However, the first start signal input/output end 260 of the source driver CD1 is utilized for inputting the first start signal Sst1*f* which is delivered by a connection line provided by the connection unit 350_3. In the circuit functional operation of the driving apparatus 610, the source driver CD3 is also set to operate in the first operation mode, but both the first and second shift operations of the source driver CD3 are set to be right-shift-based operation. The source drivers CD1, CD2, CD4 and CD5 are still set to operate in the third operation mode, but all the first shift operations of the source drivers CD1, CD2, CD4 and CD5 are set to be right-shift-based operation.

In the operation of the source driver CD1 based on the third operation mode, the source driver CD1 receives the first start signal Sst1*f* for starting the first shift operation of the source driver CD1 which in turn generates the second start signal Sst2*f* furnished to the source driver CD2. In the operation of the source driver CD2 based on the third operation mode, the source driver CD2 receives the second start signal Sst2*f* functioning as the first start signal thereof for starting the first shift operation of the source driver CD2 which in turn generates the second start signal Sst2*g* furnished to the source driver CD3. In the operation of the source driver CD3 based on the first operation mode, the source driver CD3 receives the second start signal Sst2*g* functioning as the first start signal thereof for starting the second shift operation of the source driver CD3. In one embodiment, the first shift operation of the source driver CD3 is started by an internal start signal generated in the second shift operation of the source driver CD3. In another embodiment, the first shift operation of the source driver CD3 is started by the first shift direction control signal received by the source driver CD3. Further, the first shift operation of the source driver CD3 generates the second start signal Sst2*h* furnished to the source driver CD4. In the operation of the source drivers CD4~CD5 based on the third operation mode, the source driver CD4 receives the second start signal Sst2*h* functioning as the first start signal thereof for starting the first shift operation of the source driver CD4 which in turn generates the second start signal Sst2*i* furnished to the source driver CD5 for starting the first shift operation of the source driver CD5.

Figure 7:
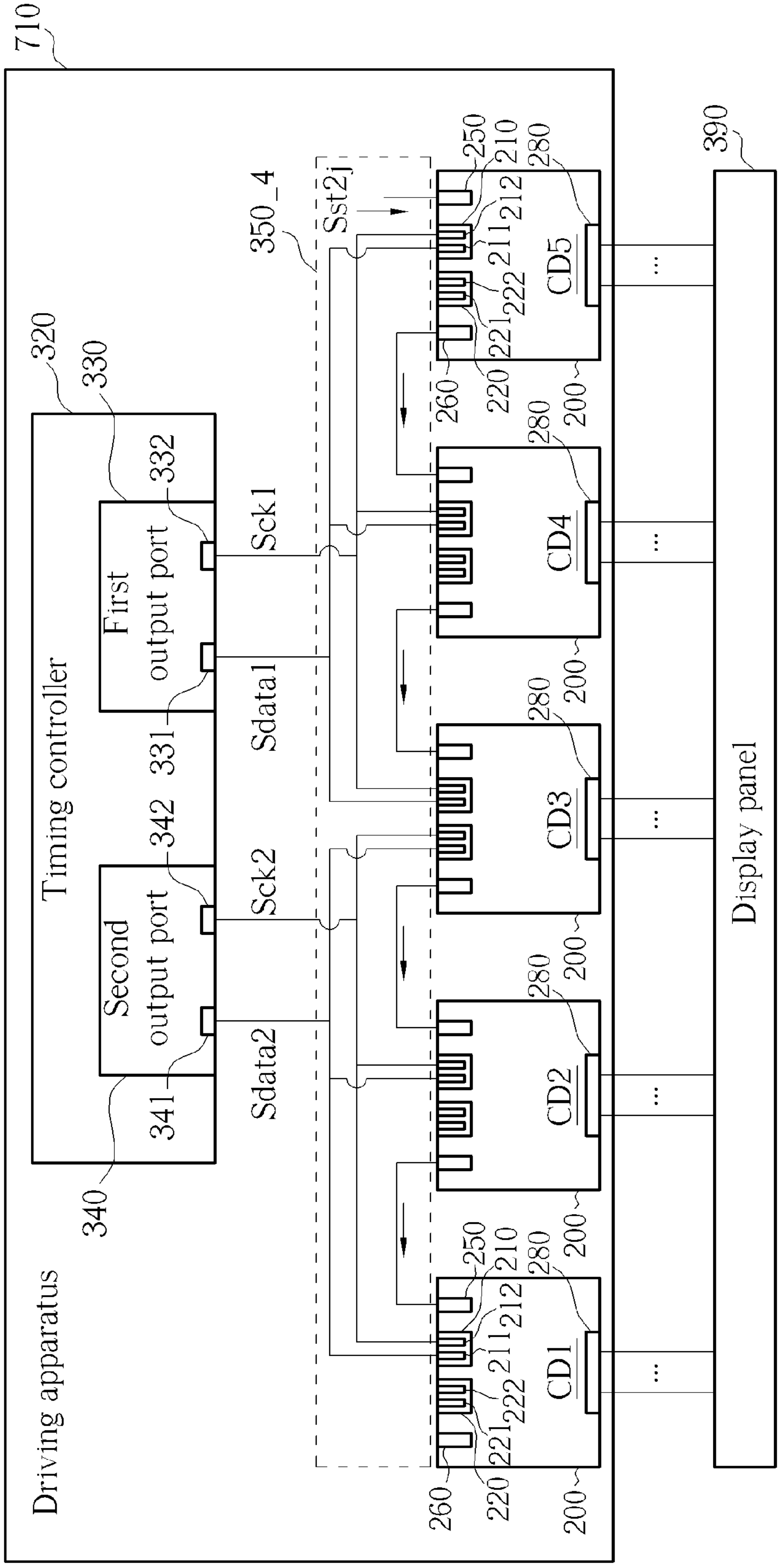
FIG. 7 is a schematic diagram showing the structure of a driving apparatus in accordance with a fifth embodiment of the present invention.

FIG. 7 is a schematic diagram showing the structure of a driving apparatus in accordance with a fifth embodiment of the present invention. As shown in FIG. 7, the driving apparatus 710 is similar to the driving apparatus 410 shown in FIG. 4, differing in that the connection unit 350_1 is replaced with a connection unit 350_4. The electrical connection relationship between the timing controller 320 and the source drivers 200 provided by the connection unit 350_4 is identical to that provided by the connection unit 350_1. However, the second start signal input/output end 250 of the source driver CD5 is utilized for inputting the second start signal Sst2*j* which is delivered by a connection line provided by the connection unit 350_4. In the circuit functional operation of the driving apparatus 710, the source driver CD3 is also set to operate in the first operation mode, but both the first and second shift operations of the source driver CD3 are set to be left-shift-based operation. The source drivers CD1, CD2, CD4 and CD5 are still set to operate in the third operation mode, but all the first shift operations of the source drivers CD1, CD2, CD4 and CD5 are set to be left-shift-based operation. The operation of the driving apparatus 710 can be easily deduced by analogy according to the operation of the driving apparatus 610 shown in FIG. 6 and, for the sake of brevity, further similar description thereof is omitted.

Figure 8:
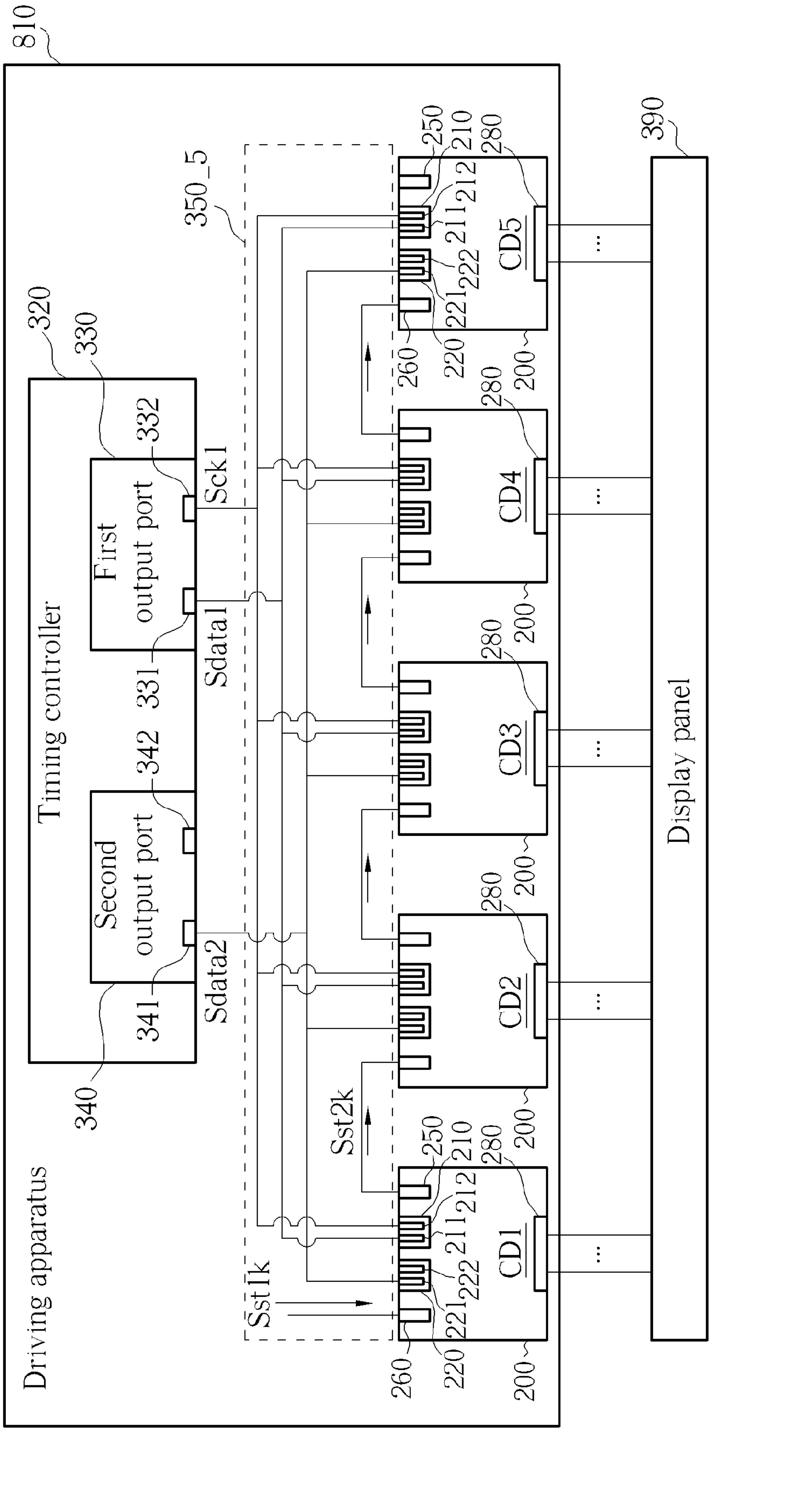
FIG. 8 is a schematic diagram showing the structure of a driving apparatus in accordance with a sixth embodiment of the present invention.

FIG. 8 is a schematic diagram showing the structure of a driving apparatus in accordance with a sixth embodiment of the present invention. As shown in FIG. 8, the driving apparatus 810 is similar to the driving apparatus 310 shown in FIG. 3, differing in that the connection unit 350 is replaced with a connection unit 350_5. The connection unit 350_5 provides related electrical connections between the timing controller 320 and the source drivers 200, which are briefed as the following. The first data output interface 331 of the first output port 330 is electrically connected to the first data input interfaces 211 of the source drivers CD1~CD5. The first clock output interface 332 of the first output port 330 is electrically connected to the first clock input interfaces 212 of the source drivers CD1~CD5. The second data output interface 341 of the second output port 340 is electrically connected to the second data input interfaces 221 of the source drivers CD1~CD5. In one embodiment, the first data signals Sdata1 outputted from the first data output interface 331 are corresponding to the image data of even pixels in each frame. And the second data signals Sdata2 outputted from the second data output interface 341 are corresponding to the image data of odd pixels in each frame. It is noted that the second clock input interfaces 222 of the source drivers CD1~CD5 are idled. Also, the second clock output interface 342 of the timing controller 320 is idled.

In the circuit functional operation of the driving apparatus 810, the source drivers CD1~CD5 are set to operate in the second operation mode. And all the first and second shift operations of the source drivers CD1~CD5 are set to be right-shift-based operation. In the operation of the source driver CD1, the source driver CD1 receives the first start signal Sst1*k* for starting the second shift operation of the source driver CD1 which in turn generates an internal start signal for starting the first shift operation of the source driver CD1. Further, the first shift operation of the source driver CD1 generates the second start signal Sst2*k* furnished to the source driver CD2. Each source driver 200 positioned on right of the source driver CD1 starts the second shift operation thereof according to one second start signal generated by an adjacent source driver 200 positioned on left of the source driver 200. And the second shift operation of the source driver 200 generates an internal start signal for starting the first shift operation of the source driver 200 which in turn generates another second start signal.

Figure 9:
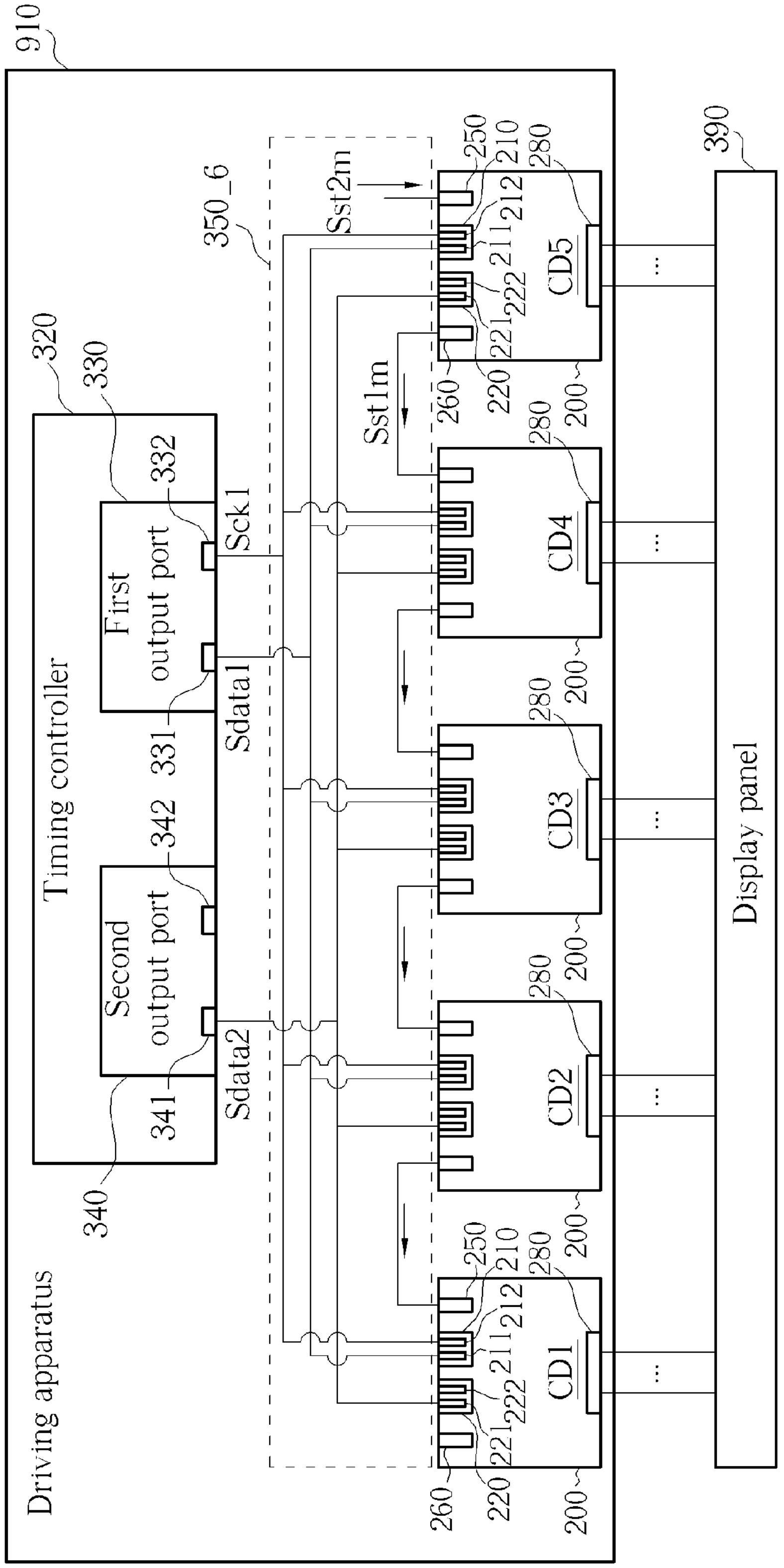
FIG. 9 is a schematic diagram showing the structure of a driving apparatus in accordance with a seventh embodiment of the present invention.

FIG. 9 is a schematic diagram showing the structure of a driving apparatus in accordance with a seventh embodiment of the present invention. As shown in FIG. 9, the driving apparatus 910 is similar to the driving apparatus 310 shown in FIG. 3, differing in that the connection unit 350 is replaced with a connection unit 350_6. The electrical connection relationship between the timing controller 320 and the source drivers 200 provided by the connection unit 350_6 is identical to that provided by the connection unit 350_5 shown in FIG. 8. However, the second start signal input/output end 250 of the source driver CD5 is utilized for inputting the second start signal Sst2*m* which is delivered by a connection line provided by the connection unit 350_6. In the circuit functional operation of the driving apparatus 910, the source drivers CD1~CD5 are set to operate in the second operation mode. And all the first and second shift operations of the source drivers CD1~CD5 are set to be left-shift-based operation.

In the operation of the source driver CD5, the source driver CD5 receives the second start signal Sst2*m* for starting the first shift operation of the source driver CD5 which in turn generates an internal start signal for starting the second shift operation of the source driver CD5. Further, the second shift operation of the source driver CD5 generates the first start signal Sst1*m* furnished to the source driver CD4. Each source driver 200 positioned on left of the source driver CD5 starts the first shift operation thereof according to one first start signal generated by an adjacent source driver 200 positioned on right of the source driver 200. And the first shift operation of the source driver 200 generates an internal start signal for starting the second shift operation of the source driver 200 which in turn generates another first start signal.

Figure 10:
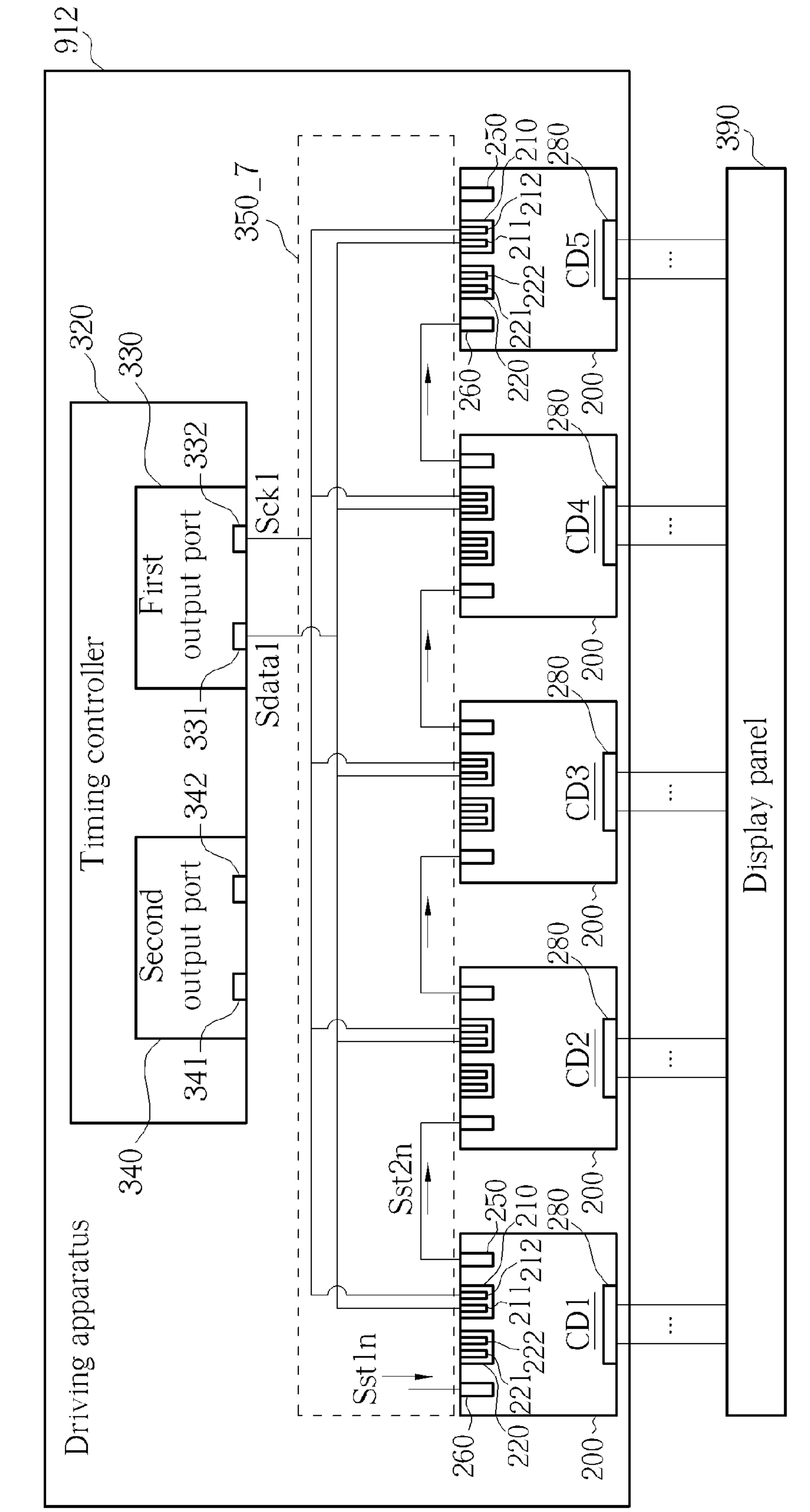
FIG. 10 is a schematic diagram showing the structure of a driving apparatus in accordance with an eighth embodiment of the present invention.

FIG. 10 is a schematic diagram showing the structure of a driving apparatus in accordance with an eighth embodiment of the present invention. As shown in FIG. 10, the driving apparatus 912 is similar to the driving apparatus 310 shown in FIG. 3, differing in that the connection unit 350 is replaced with a connection unit 350_7. The connection unit 350_7 provides related electrical connections between the timing controller 320 and the source drivers 200, which are briefed as the following. The first data output interface 331 of the first output port 330 is electrically connected to the first data input interfaces 211 of the source drivers CD1~CD5. The first clock output interface 332 of the first output port 330 is electrically connected to the first clock input interfaces 212 of the source drivers CD1~CD5. It is noted that the second input ports 220 of the source drivers CD1~CD5 are idled. Also, the second output port 340 of the timing controller 320 is idled. Therefore, the first data signals Sdata1 outputted from the first data output interface 331 include the image data of all pixels in each frame.

In the circuit functional operation of the driving apparatus 912, the source drivers CD1~CD5 are set to operate in the third operation mode. And all the first shift operations of the source drivers CD1~CD5 are set to be right-shift-based operation. In the operation of the source driver CD1, the source driver CD1 receives the first start signal Sst1*n* for starting the first shift operation of the source driver CD1 which in turn generates the second start signal Sst2*n* furnished to the source driver CD2. Each source driver 200 positioned on right of the source driver CD1 starts the first shift operation thereof according to one second start signal generated by an adjacent source driver 200 positioned on left of the source driver 200. And the first shift operation of the source driver 200 generates another second start signal.

Figure 11:
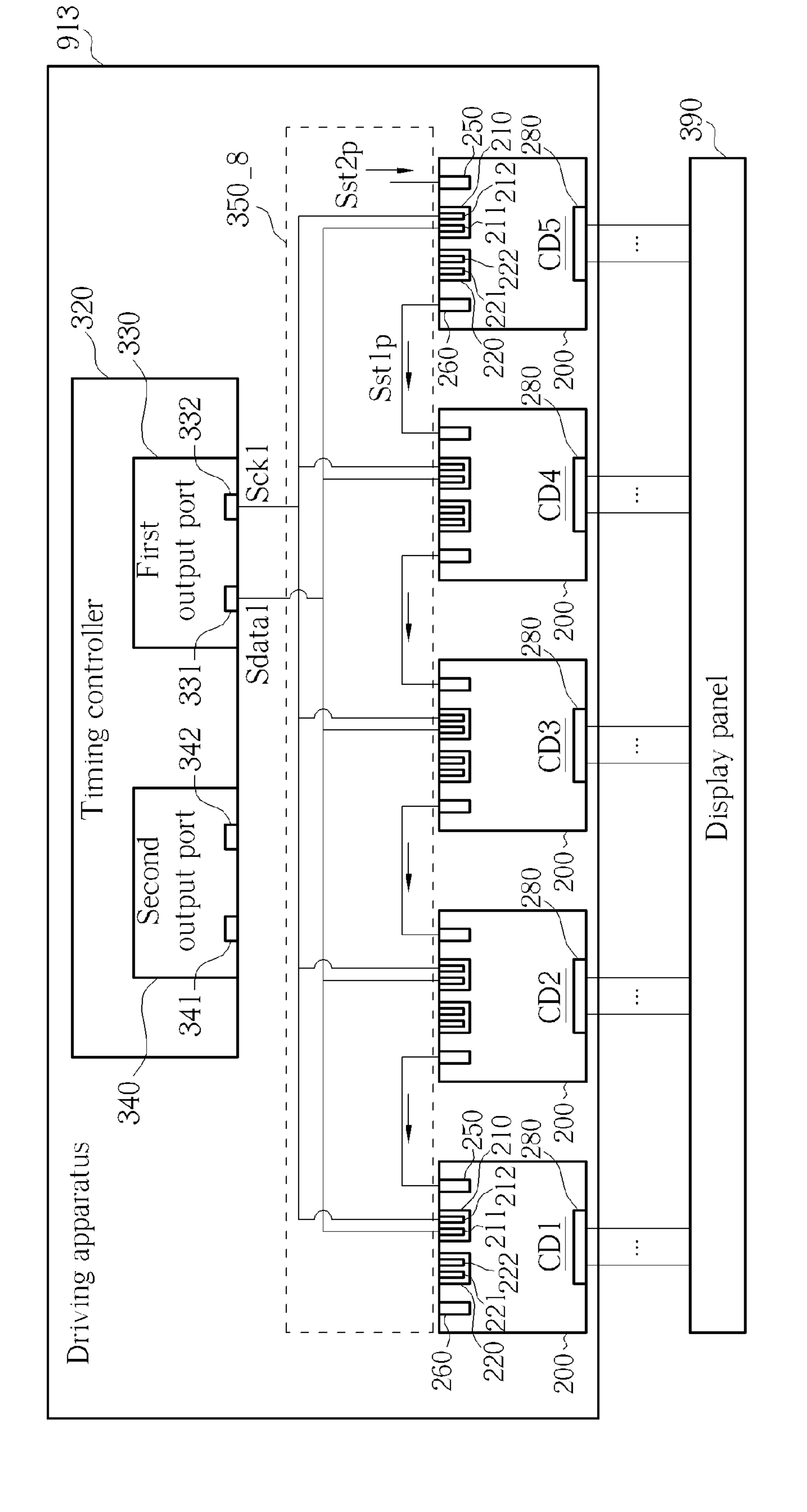
FIG. 11 is a schematic diagram showing the structure of a driving apparatus in accordance with a ninth embodiment of the present invention.

FIG. 11 is a schematic diagram showing the structure of a driving apparatus in accordance with a ninth embodiment of the present invention. As shown in FIG. 11, the driving apparatus 913 is similar to the driving apparatus 310 shown in FIG. 3, differing in that the connection unit 350 is replaced with a connection unit 350_8. The electrical connection relationship between the timing controller 320 and the source drivers 200 provided by the connection unit 350_8 is identical to that provided by the connection unit 350_7 shown in FIG. 10. However, the second start signal input/output end 250 of the source driver CD5 is utilized for inputting the second start signal Sst2*p* which is delivered by a connection line provided by the connection unit 350_8. In the circuit functional operation of the driving apparatus 913, the source drivers CD1~CD5 are set to operate in the third operation mode. And all the first shift operations of the source drivers CD1~CD5 are set to be left-shift-based operation.

In the operation of the source driver CD5, the source driver CD5 receives the second start signal Sst2*p* for starting the first shift operation of the source driver CD5 which in turn generates the first start signal Sst1*p* furnished to the source driver CD4. Each source driver 200 positioned on left of the source driver CD5 starts the first shift operation thereof according to one first start signal generated by an adjacent source driver 200 positioned on right of the source driver 200. And the first shift operation of the source driver 200 generates another first start signal.

Figure 12:
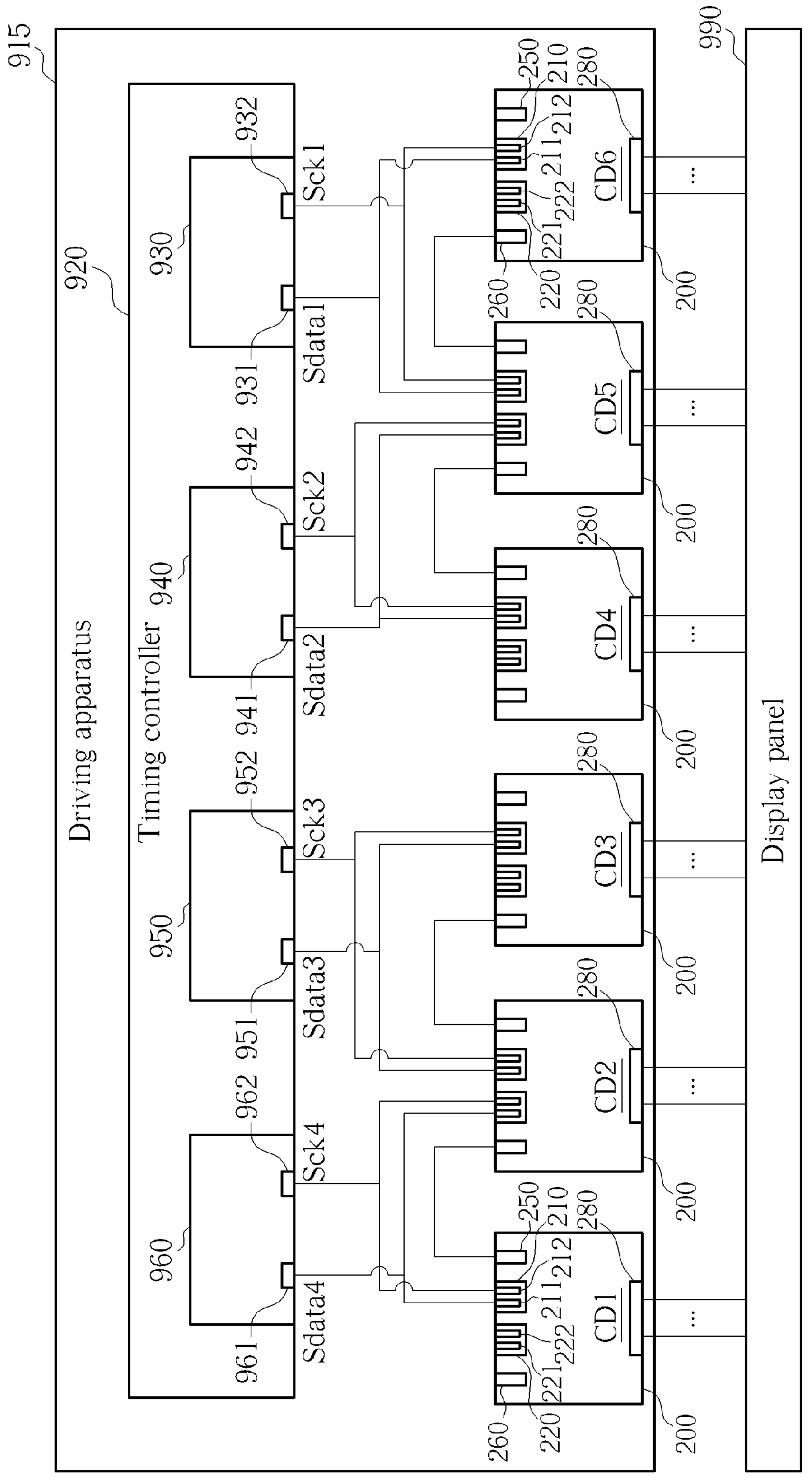
FIG. 12 is a schematic diagram showing the structure of a driving apparatus in accordance with a tenth embodiment of the present invention.

FIG. 12 is a schematic diagram showing the structure of a driving apparatus in accordance with a tenth embodiment of the present invention. As shown in FIG. 12, the driving apparatus 915 comprises a timing controller 920 and a plurality of source drivers 200, which are employed to provide plural data driving signals for driving a display panel 990. The timing controller 920 includes a first output port 930, a second output port 940, a third output port 950, and a fourth output port 960. The first output port 930 has a first data output interface 931 and a first clock output interface 932. The second output port 940 has a second data output interface 941 and a second clock output interface 942. The third output port 950 has a third data output interface 951 and a third clock output interface 952. The fourth output port 960 has a fourth data output interface 961 and a fourth clock output interface 962.

The first data output interface 931 is employed to output plural first data signals Sdata1, and the first clock output interface 932 is employed to output a first clock signal Sck1. The second data output interface 941 is employed to output plural second data signals Sdata2, and the second clock output interface 942 is employed to output a second clock signal Sck2. The third data output interface 951 is employed to output plural third data signals Sdata3, and the third clock output interface 952 is employed to output a third clock signal Sck3. The fourth data output interface 961 is employed to output plural fourth data signals Sdata4, and the fourth clock output interface 962 is employed to output a fourth clock signal Sck4.

The electrical connection relationship regarding the timing controller 920 and the source drivers 200 is briefed as the following. The first data output interface 931 of the first output port 930 is electrically connected to the first data input interfaces 211 of the source drivers CD5~CD6. The first clock output interface 932 of the first output port 930 is electrically connected to the first clock input interfaces 212 of the source drivers CD5~CD6. The second data output interface 941 of the second output port 940 is electrically connected to the first data input interface 211 of the source driver CD4 and the second data input interface 221 of the source driver CD5. The second clock output interface 942 of the second output port 940 is electrically connected to the first clock input interface 212 of the source driver CD4 and the second clock input interface 222 of the source driver CD5. The second start signal input/output end 250 of the source driver CD5 is electrically connected to the first start signal input/output end 260 of the source driver CD6. The first start signal input/output end 260 of the source driver CD5 is electrically connected to the second start signal input/output end 250 of the source driver CD4.

The third data output interface 951 of the third output port 950 is electrically connected to the first data input interfaces 211 of the source drivers CD2~CD3. The third clock output interface 952 of the third output port 950 is electrically connected to the first clock input interfaces 212 of the source drivers CD2~CD3. The fourth data output interface 961 of the fourth output port 960 is electrically connected to the first data input interface 211 of the source driver CD1 and the second data input interface 221 of the source driver CD2. The fourth clock output interface 962 of the fourth output port 960 is electrically connected to the first clock input interface 212 of the source driver CD1 and the second clock input interface 222 of the source driver CD2. The second start signal input/output end 250 of the source driver CD2 is electrically connected to the first start signal input/output end 260 of the source driver CD3. The first start signal input/output end 260 of the source driver CD2 is electrically connected to the second start signal input/output end 250 of the source driver CD1.

In the circuit functional operation of the driving apparatus 915, the source drivers CD2, CD5 are set to operate in the first operation mode, and the source drivers CD1, CD3, CD4 and CD6 are set to operate in the third operation mode. Besides, regarding the first start signal input/output ends 260 of the source drivers CD1, CD4 and the second start signal input/output ends 250 of the source drivers CD3, CD6, each start signal input/output end thereof may be idled or for inputting a corresponding start signal. In view of that, the shift direction of each shift operation performed by any of the source drivers CD1~CD6 can be set according to the requirement of desired driving operation.

In conclusion, the present invention is set forth to design a driving apparatus based on multi-port architecture regardless of odd or even number of source drivers disposed thereof. And the printed circuit board which mounts the driving apparatus is able to spare more board area for accommodating more terminal resistors so as to improve the signal integrity of differential signals received by each source driver. Furthermore, the shift direction of the first shift operation and/or the second shift operation performed by each source driver can be set according to the requirement of desired driving operation. That is, the driving apparatus of the present invention is able to achieve both excellent operational performance and high application flexibility.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A driving apparatus for driving a display panel, the driving apparatus comprising:

a timing controller comprising a first output port and a second output port, the first output port being employed to output plural first data signals and a first clock signal, and the second output port being employed to output plural second data signals and a second clock signal different from the first clock signal; and a plurality of source drivers for driving the display panel according to the first data signals and/or the second data signals, each source driver comprising a first input port, a second input port, a first shift direction control end, a second shift direction control end and at least two operation mode control ends, the first input port being electrically connected to the first or second output port of the timing controller, the first shift direction control end being for receiving a first shift direction control signal, wherein the source driver employs the first shift direction control signal to set a first shift direction of a first shift operation performed by the source driver for controlling a data latch operation over the first data signals based on the first clock signal, the second shift direction control end being for receiving a second shift direction control signal, wherein the source driver employs the second shift direction control signal to set a second shift direction of a second shift operation performed by the source driver for controlling a data latch operation over the second data signals based on the second clock signal;

wherein when the at least two operation mode control ends of the source driver receive an operation mode control signal for setting the source driver to operate in a first operation mode, the first input port of the source driver is electrically connected to the first output port of the timing controller for receiving the first data signals and the first clock signal, the second input port of the source driver is electrically connected to the second output port of the timing controller for receiving the second data signals and the second clock signal, and the source driver drives the display panel according to the first data signals, the second data signals, the first clock signal and the second clock signal.

2. The driving apparatus of claim 1, wherein when the second shift direction control end is idled, if the second input port inputs the second data signals, the source driver employs the first shift direction control signal to set the first and second shift directions for controlling the data latch operations respectively over the first data signals and the second data signals based on the first clock signal.

3. The driving apparatus of claim 2, wherein when the operation mode control signal sets the source driver to operate in a second operation mode, the first input port of the source driver is electrically connected to the first output port of the timing controller for receiving the first data signals and the first clock signal, the second input port of the source driver is electrically connected to the second output port of the timing controller for receiving the second data signals, and the source driver drives the display panel according to the first data signals, the second data signals and the first clock signal.

4. The driving apparatus of claim 2, wherein when the operation mode control signal sets the source driver to operate in a third operation mode, the first input port of the source driver is electrically connected to the first output port of the timing controller for receiving the first data signals and the first clock signal, and the source driver drives the display panel according to the first data signals and the first clock signal.

5. The driving apparatus of claim 2, wherein when the first data signals, the second data signals, the first clock signal and the second clock signal are differential signals.

6. The driving apparatus of claim 2, wherein the source driver further comprises:

a second start signal input/output end for inputting or outputting a second start signal, wherein if the second start signal input/output end is utilized for inputting the second start signal, the second start signal is employed to start the first shift operation; and a first start signal input/output end for inputting or outputting a first start signal, wherein if the first start signal input/output end is utilized for inputting the first start signal, the first start signal is employed to start the second shift operation or the first shift operation.

7. The driving apparatus of claim 6, wherein if the second start signal input/output end is utilized for outputting the second start signal and the first start signal input/output end is utilized for outputting the first start signal, the first shift direction control signal is further employed to start the first shift operation and the second shift direction control signal is further employed to start the second shift operation.

8. The driving apparatus of claim 6, wherein if the first start signal input/output end is utilized for inputting the first start signal and the second start signal input/output end is utilized for outputting the second start signal, the second shift operation is started by the first start signal, and the first shift operation is started by an internal start signal generated in the second shift operation or by the first shift direction control signal.

9. The driving apparatus of claim 6, wherein if the second start signal input/output end is utilized for inputting the second start signal and the first start signal input/output end is utilized for outputting the first start signal, the first shift operation is started by the second start signal, and the second shift operation is started by an internal start signal generated in the first shift operation or by the second shift direction control signal.

10. The driving apparatus of claim 1, wherein the source driver further comprises:

a driving output port, electrically connected to the display panel, for outputting plural data driving signals to drive the display panel.

11. A source driver for driving a display panel, the source driver comprising:

a first input port for receiving plural first data signals and a first clock signal;

a second input port for receiving plural second data signals and a second clock signal different from the first clock signal;

at least two operation mode control ends for receiving an operation mode control signal having at least two bits;

a driving output port, electrically connected to the display panel, for outputting plural data driving signals to drive the display panel;

a first shift direction control end for receiving a first shift direction control signal, wherein the source driver employs the first shift direction control signal to set a first shift direction of a first shift operation performed by the source driver for controlling a data latch operation over the first data signals based on the first clock signal; and a second shift direction control end for receiving a second shift direction control signal, wherein the source driver employs the second shift direction control signal to set a second shift direction of a second shift operation performed by the source driver for controlling a data latch operation over the second data signals based on the second clock signal;

wherein when the operation mode control signal sets the source driver to operate in a first operation mode, the source driver provides the data driving signals to drive the display panel according to the first data signals, the second data signals, the first clock signal and the second clock signal.

12. The source driver of claim 11, wherein when the second shift direction control end is idled, if the second input port inputs the second data signals, the source driver employs the first shift direction control signal to set the first and second shift directions for controlling the data latch operations respectively over the first data signals and the second data signals based on the first clock signal.

13. The source driver of claim 12, wherein:

when the operation mode control signal sets the source driver to operate in a second operation mode, the source driver provides the data driving signals to drive the display panel according to the first data signals, the second data signals and the first clock signal; and when the operation mode control signal sets the source driver to operate in a third operation mode, the source driver provides the data driving signals to drive the display panel according to the first data signals and the first clock signal.

14. The source driver of claim 12, wherein when the first data signals, the second data signals, the first clock signal and the second clock signal are differential signals.

15. The source driver of claim 12, further comprising:

a second start signal input/output end for inputting or outputting a second start signal, wherein if the second start signal input/output end is utilized for inputting the second start signal, the second start signal is employed to start the first shift operation; and a first start signal input/output end for inputting or outputting a first start signal, wherein if the first start signal input/output end is utilized for inputting the first start signal, the first start signal is employed to start the second shift operation or the first shift operation.

16. The source driver of claim 15, wherein if the second start signal input/output end is utilized for outputting the second start signal and the first start signal input/output end is utilized for outputting the first start signal, the first shift direction control signal is further employed to start the first shift operation and the second shift direction control signal is further employed to start the second shift operation.

17. The source driver of claim 15, wherein if the first start signal input/output end is utilized for inputting the first start signal and the second start signal input/output end is utilized for outputting the second start signal, the second shift operation is started by the first start signal, and the first shift operation is started by an internal start signal generated in the second shift operation or by the first shift direction control signal.

18. The source driver of claim 15, wherein if the second start signal input/output end is utilized for inputting the second start signal and the first start signal input/output end is utilized for outputting the first start signal, the first shift operation is started by the second start signal, and the second shift operation is started by an internal start signal generated in the first shift operation or by the second shift direction control signal.

* * * * *